Figure 1:
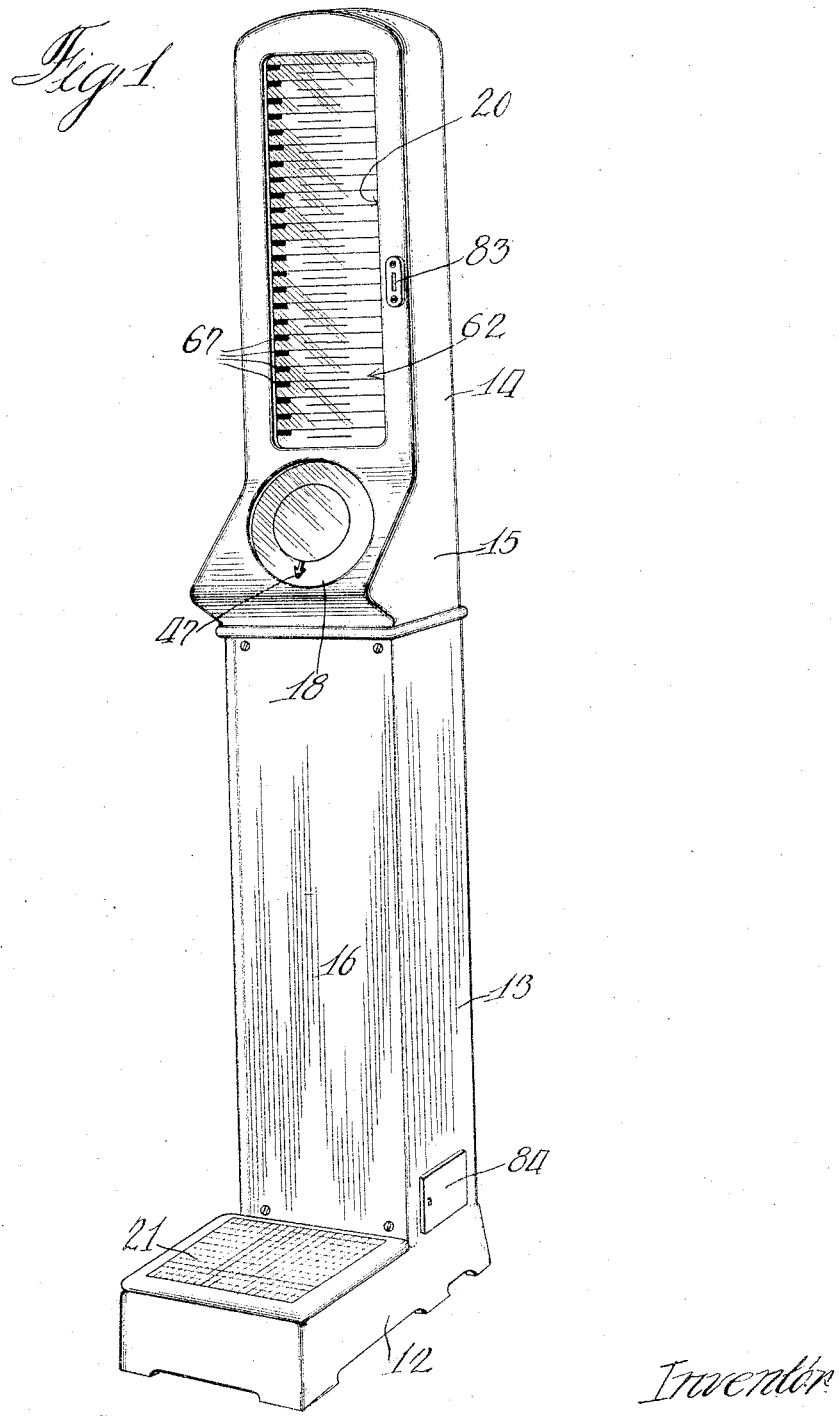

April 12, 1927.  V. SLEZAK  1,624,019
MEASURING AND WEIGHING DEVICE
Filed Aug. 14, 1922    4 Sheets-Sheet 1

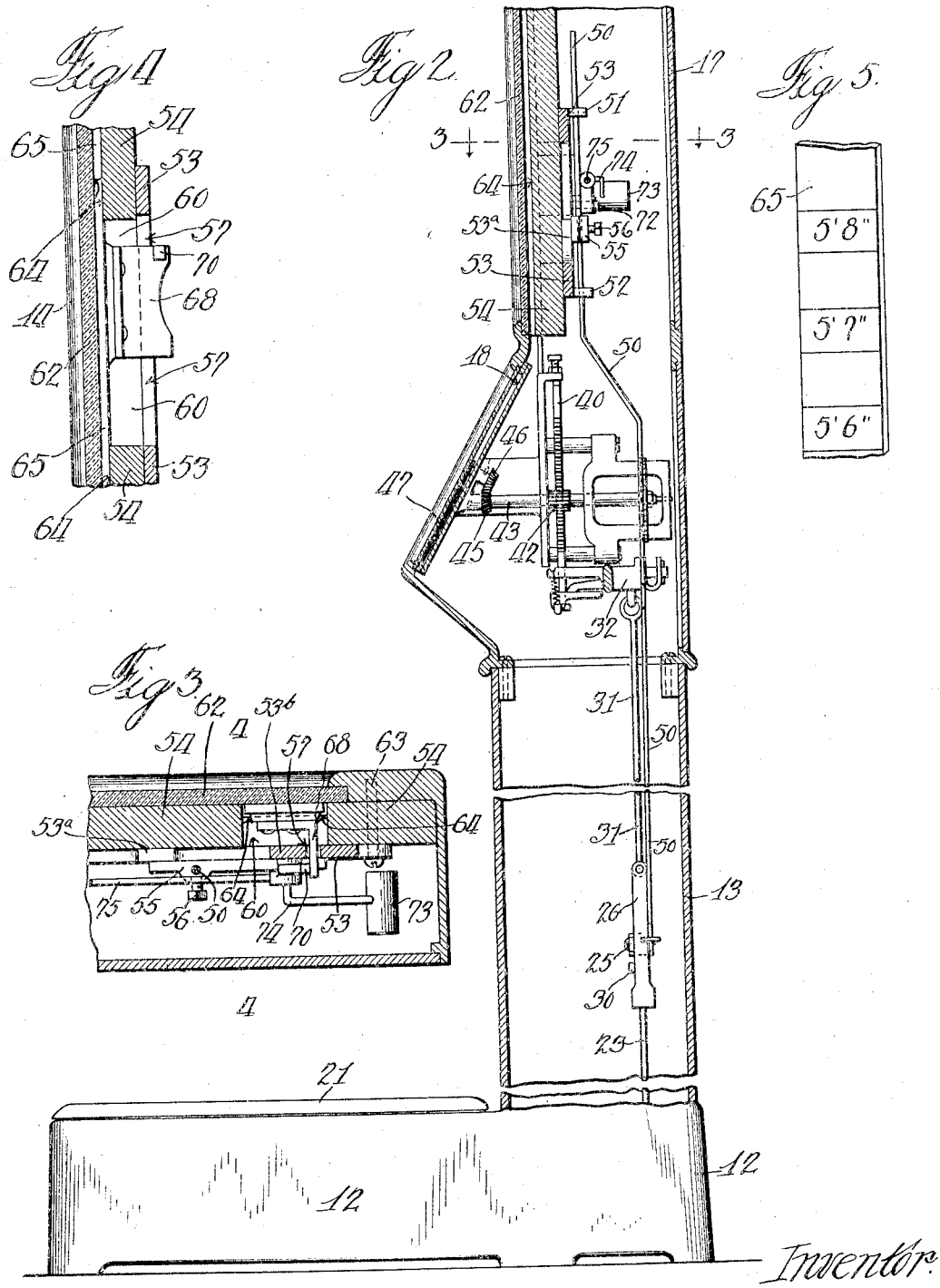

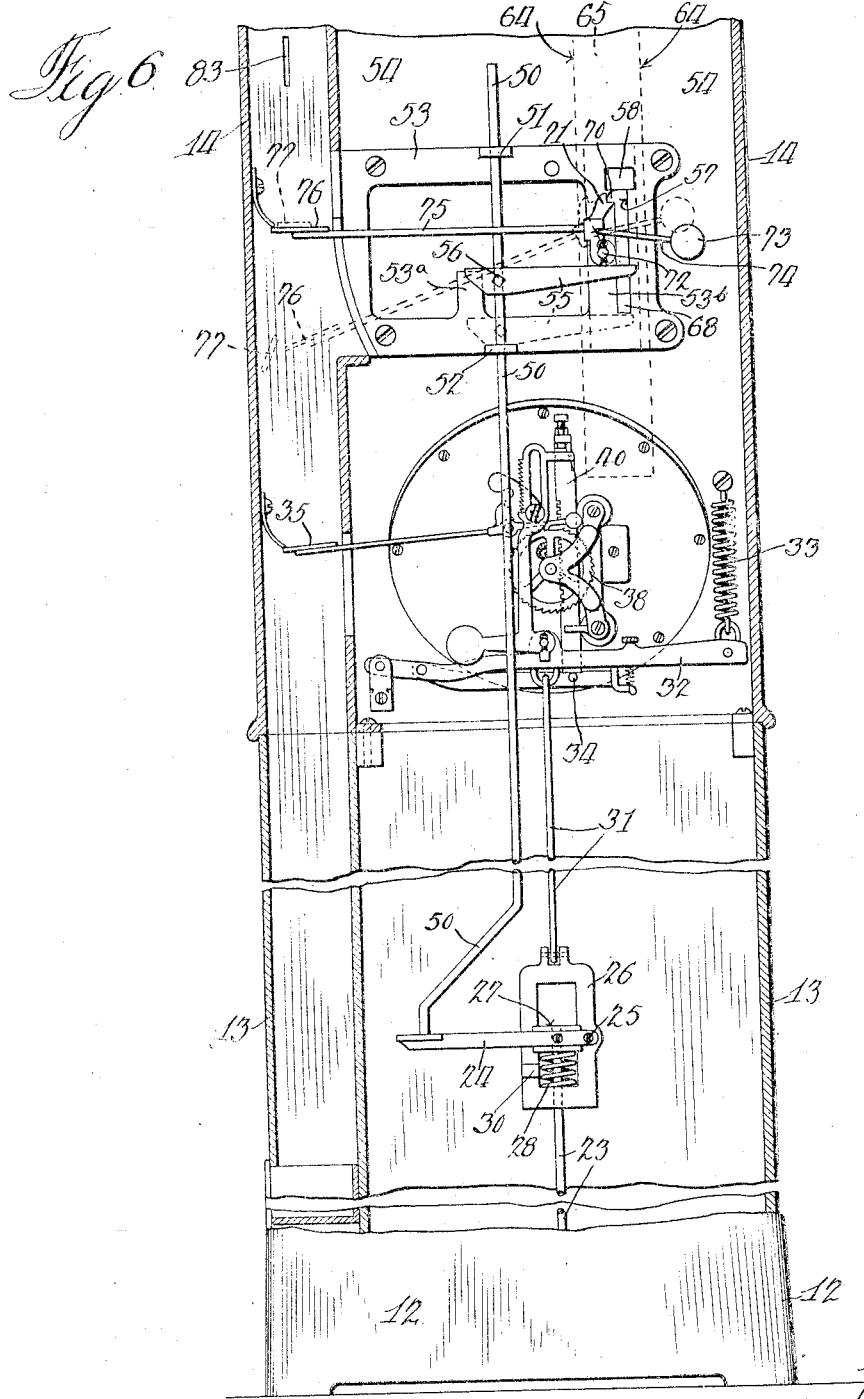

April 12, 1927.　　　V. SLEZAK　　　1,624,019
MEASURING AND WEIGHING DEVICE
Filed Aug. 14, 1922　　　4 Sheets-Sheet 4
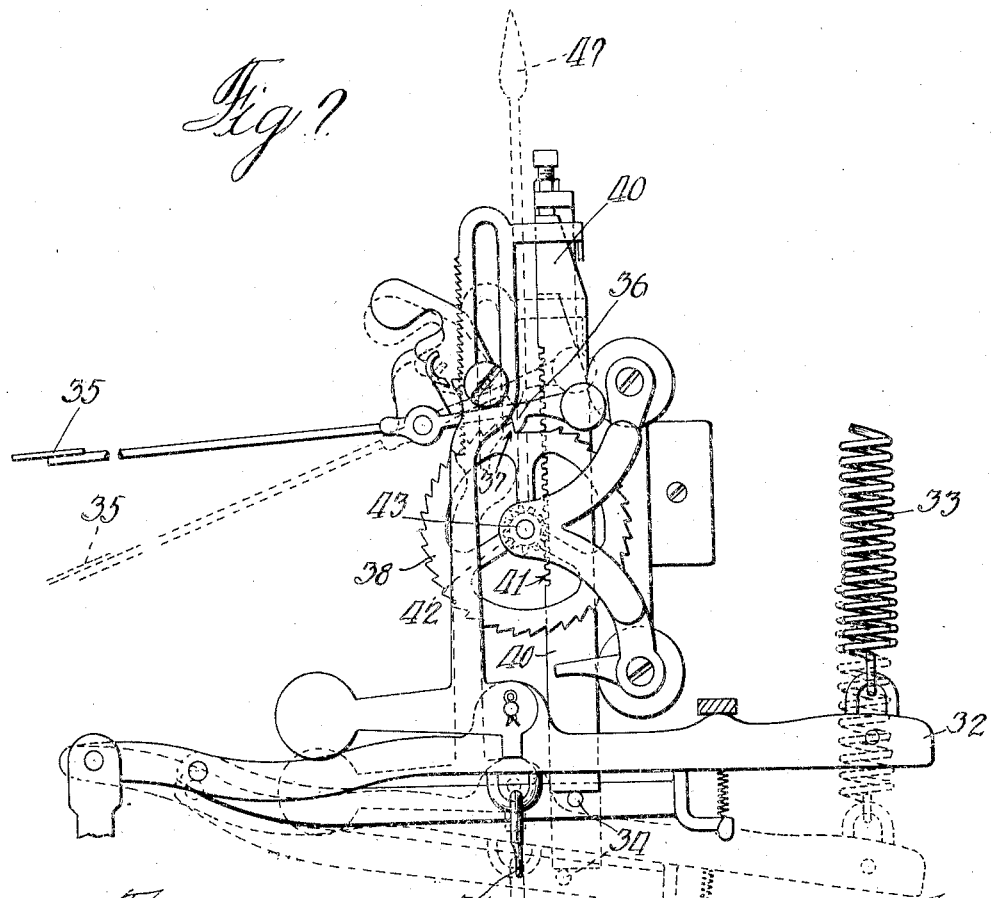
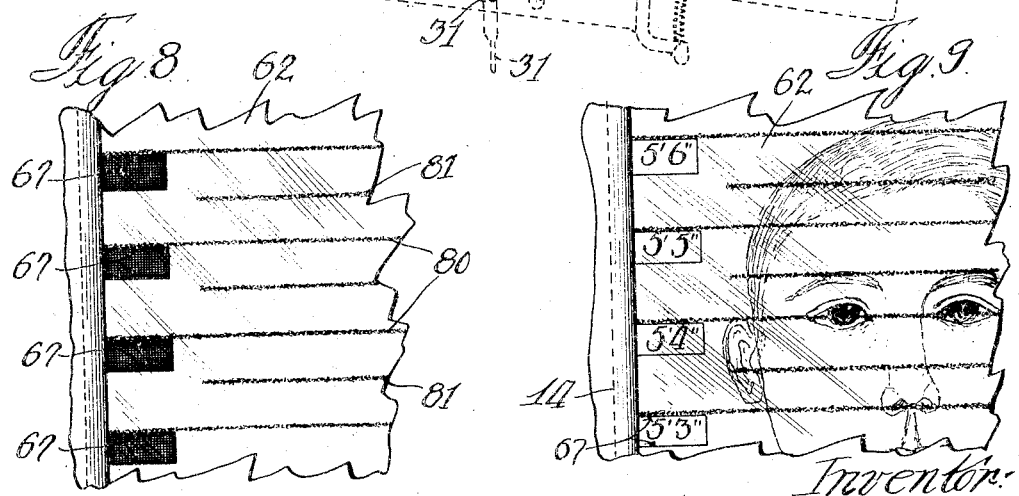
Inventor:
Vincent Slezak
By Luther Johns Atty.
Witness:
Dave I. Magnusson Patented Apr. 12, 1927.

1,624,019

UNITED STATES PATENT OFFICE.

VINCENT SLEZAK, OF CHICAGO, ILLINOIS.

MEASURING AND WEIGHING DEVICE.

Application filed August 14, 1922. Serial No. 581,653.

These improvements relate, first, to means for determining substantially the height of a person, and, secondly to a device combining means for determining both the weight and substantially the height of a person standing on the platform of the device.

The chief object of the height-measuring device is to provide means whereby a person may readily determine substantially his height in a simple and easy manner, as by merely looking at the proper indication and without making an adjustment of a part or parts. One important object and advantage is in the provision of means whereby substantially the height of a person may be self-determined without removing his or her hat or giving any considerations whatsoever to the character of the hair dressing, or interfering with it. Another object is to provide a coin-controlled device having such advantages.

With respect to the combined instrumentalities it is an object to provide means whereby a person may determine both his weight and his height while standing on the platform of the device; and to provide coin-controlled apparatus for this purpose.

A general object is to provide simple and conveniently-operable means, not likely readily to get out of order, for the purposes set forth.

Still other objects and advantages will appear hereinafter.

With respect to the height-measuring device, which may, of course, be separately employed, the preferred mode of carrying the invention into practical effect is to provide a series of height indications substantially vertically arranged, with means for determining which of said indications is substantially opposite the eyes of the person standing adjacent thereto, the indication which is substantially opposite his eyes being in terms which include the actual distance from his eyes to the bottom of his feet plus the average distance in human heads of mature size from the eyes to the top of the head. Thus, assuming that the average vertical distance between two horizontal planes one of which passes through the pupils of the eyes and the other of which touches the top of the head is four inches, and assuming that a particular person's height from the bottom of his feet to the pupils of his eyes is five feet, his total height being therefore substantially five feet and four inches, the indication found to be opposite his eyes will be 5′ 4″.

In the accompanying drawings, which form a part of this specification, I have illustrated a preferred embodiment of these improvements both with respect to the height-measuring device and with respect to the combined height-and-weight-indicating means.

In these drawings Figure 1 is a perspective of the combined instrument as it appears when ready for operation; Fig. 2 is an enlarged fragmentary view in vertical section showing operative parts in side view; Fig. 3 is an enlarged fragmentary sectional view, as on the line 3—3 of Fig. 2; Fig. 4 is a fragmentary detail in section on the line 4—4 of Fig. 3; Fig. 5 is a fragmentary nearly full-face view of the scale device having the reading indications thereon; Fig. 6 is an enlarged fragmentary rear view taken sectionally through the outer casing showing the several mechanisms herein described; Fig. 7 is a greatly enlarged view of the weighing mechanism shown in Fig. 6; Fig. 8 is a fragmentary face view of the mirror showing height indications thereon as graduations and showing sight openings, the reading indications being concealed; and Fig. 9 is a view similar to that of Fig. 8 showing the reading indications exposed through the sight openings and showing also a reflected image of a person reading his height.

Referring to Fig. 1, the base of the device includes a horizontally-disposed casing 12 from which vertically rises a rectangular polygonal casing 13 upon which is secured the vertically extending casing 14 having the enlargement 15 constituting a housing for the weighing mechanism. The casing parts 12, 13, 14 and 15 may be considered as castings. A front wall 16 is readily removably secured upon the casing part 13. A removable rear wall 17 provides access to the casing 14. The housing part 15 has its front surface sloping downwardly and forwardly so that the dial 18 thereon may conveniently be read by a person standing on the base. The upper casing 14 has a relatively long vertically disposed sight opening 20 so positioned that it will be directly opposite the head of a person standing on the base.

The base 12 is covered by a platform 21 which has a small amount of downward movement. It is to be understood that the base 12 carries a system of levers of any approved form and arrangement such as is suitable in connection with platform scales. Such platform-supporting levers are not illustrated herein as they may be of any well-known construction.

Referring to Figs. 2 and 6 it is to be understood that the weighing levers in the base 12 are operatively connected to the pull rod 23, as in ordinary platform scale practice, whereby when a person stands on the platform 21 his weight will induce downward movement of the pull rod 23. This pull rod 23 is connected to a lever 24 pivoted at 25 on the yoke 26 accommodating the sliding cross-head 27 which may be drawn downward relative to the yoke against the resistance of the coiled spring 28. A pair of stops 30 on the yoke 26 limit the downward movement of the cross-head 27, and when the cross-head engages these stops the full effect of the weight of the person on the platform is communicated through the cross-head to the pull rod 31 connected to the weighing lever 32 and which is drawn downward against the resistance of the weighing spring 33.

The weighing mechanism illustrated is of a type and construction well known, and it is believed sufficient here to point out, by reference particularly to Fig. 7, that when the weighing lever 32 is pulled downward, as into its dotted line position in that view, the stop 34 is also moved downward to a greater or less extent according to the weight of the person on the platform; that when a coin strikes the plate 35 the dog 36 is raised out of engagement with the tooth 37 of the ratchet-like wheel 38 and that thereupon the sliding rack member 40 descends freely by gravitation until it strikes the stop 34; that the rack member 40 has teeth 41 engaging the pinion 42 on the shaft 43, on which shaft the wheel 38 is also mounted, causing this shaft 43 to rotate. By reference to Fig. 2 it will be noted that the shaft 43 carries a bevel pinion 45 meshing with a bevel pinion 46 which is on a shaft carrying the pointer 47. From this description taken with the illustrations it is clear that according to the weight of the person on the platform the pointer 47 will move over the scale 18 to a greater or less extent, and thereby indicate the person's weight. When the person steps off of the platform the several weighing mechanism parts are restored to initial position.

I do not claim any invention of my own in the weighing mechanism illustrated. Inasmuch as any suitable weighing mechanism may be used a description in detail of particular weighing mechanism is not deemed to be essential here, and, furthermore, as stated, the one illustrated is well known.

Referring now to the height-measuring device, it will be noted from Fig. 6 that the lever 24 is a rod 50, and resting upon the lever 24 is such that the lever 24 will have relatively great movement at its end where the rod 50 rests upon it when relatively slight movement of the pull rod 23 occurs. When a person steps upon the platform 21, therefore, the downward movement of the lever 24 permits the rod 50 to descend by gravitation a materially great distance. This rod 50 is slidingly mounted in a pair of projections 51 and 52 extending outwardly from a plate-like frame 53 secured as by screws upon a board base 54 (Figs. 2 and 3) which may be considered as substantially filling the space between the lateral walls of the housing 14 and which extends from its position shown in Fig. 3 upward substantially to the top of the casing 14. A stop member 55 is secured as by a set screw 56 upon the rod 50, and this stop member comes to rest upon the lower projection 52 and thus the downward movement of the rod 50 is limited, as shown by the dotted-line position of the stop member 55, in Fig. 6. The frame 53 carries an upstanding projection 53ª (Fig. 6) in the same planes as the rest of the frame body, and since the member 55 travels closely adjacent to frame parts 53ª and 53ᵇ the stop member 55 and the rod 50 are maintained against turning movements, and the stop member and the rod move as a unit always in the same vertical planes.

The frame member 53 is provided with a slot-like vertical opening at 57 (Figs. 3, 4 and 6) having an enlarged portion 58 at the top, and the wooden base 54 (Figs. 3 and 4) is provided with an opening 60 opposite the slot 57. The enlarged opening 58 is for assembling the parts.

From Fig. 3 it will well be seen that a plate of glass 62, which is to be considered a mirror, is held in the frame 14 by the board 54, and that the screws as 63 which hold the frame 53 upon the wood backing also hold the wood member 54 to the frame 14.

The wood member 54 is provided from end to end with a vertical groove or recess indicated at 64 (Figs. 2, 3 and 4) and by dotted lines in Fig. 6. Within this groove 64 is arranged a vertically sliding flat bar or strip 65, which may be of wood but which in my practice is of tin with side edges beaded. Fig. 5 fragmentarily shows this sliding member 65 as a uniform strip in almost full-face view. On this member 65 are arranged reading indications in terms of feet and inches, these indications being spaced an inch apart in actual practice where they are intended to indicate differences of an inch between them.

The mirror 62 has a plurality of sight openings 67 which are also spaced one inch apart to correspond with the spacing of the reading indications on the vertically moving member 65. The sight openings 67 are directly opposite these reading indications, and the result is that when the member 65 moves downward, say half an inch, the reading indications on the member 65 are exposed to view through the sight openings 67 respectively, and, conversely, when the member 65 is moved upward, say half an inch, these reading indications will be concealed by the portions of the mirror between adjacent ones of the sight openings respectively.

From Fig. 4 it will be noted that a plate-like projecting member 68 is secured upon the sliding member 65, and that this member 68 may move vertically up and down in the openings 57 and 60. The member 68 carries a lug 70 which serves as a catch or stop for holding the member 65 in raised position. In assembling the parts the lug 70 passes through the enlarged opening 58. Cooperating means for holding the member 68 are the dog 71 (Fig. 6) pivoted on a stud 72 rigid with the frame part 53$^b$, a weight 73 connected by an arm 74 to this dog 71, and another lever arm 75 also connected to the dog member 71, a small plate 76 for a coin, as 77, being secured at the end of the lever 75. The construction and arrangement are such that when a coin 77 strikes the plate 76 and moves it into its dotted line position shown in Fig. 6 the dog 71 is withdrawn out of engagement with the projection 70 permitting the member 65 to descend by gravitation until the part 68 strikes the stop 55, which stop 55 was lowered, it will be recalled, through the action of the person stepping upon the platform. The weight of the coin therefore induces movement of a member, as 65, whereby the reading indications are brought into view.

When the person steps off of the platform the weighing spring 33 raises the lever 32 and with it the pull rod 31, and this movement coupled with the action of the spring 28 raises the lever 24 pushing upward the rod 50 and also the stop member 55, and, since the projection 68 is at such time resting on the stop 55 the projection 68 is also pushed upward, and thereby the reading indications are moved into concealed position. As soon as the coin 77 slides off of the plate 76 the weight 73 restores the rod 75 to its initial position. On the upward movement of the projection 68 the lug 70 forces the dog 71 away slightly until the lug 70 passes by whereupon the lug 70 becomes caught by the dog 71 and the device is ready for another measuring operation.

The mirror 62 constitutes preferred means for determining when the eyes of the person being measured are substantially opposite a particular indication closely associated with the mirror, for instance some graduation thereon. To facilitate reference to the reading indications such as 5′ 3″, 5′ 4″, etc., shown on Fig. 9 the mirror is marked with indications in the form of graduations 80 and 81, as by etching lines horizontally on the vertically disposed mirror. The main graduations 80 are associated with the reading indications while the graduations 81 indicate half-inch steps between the main indications.

Referring to Fig. 9 it will be noted that the person measuring himself as to height has positioned his head so that he has the top of his ears and the centers of his eyes respectively in a horizontal plane. For the purpose of illustration this plane is shown as being coincident with the main graduation 80 associated with the reading indication 5′ 4″, which indicates that the person's height is substantially five feet and four inches. This height of 5′ 4″ was arrived at by adding say four inches as the average height between horizontal planes, one of which passes through the eyes and the other of which touches the top of the head, to the actual distance from the eyes (with the head so positioned) to the soles of the feet of the person standing on the platform. The operator could tilt his head forward and back so as to vary quite materially the distance from his eyes to the platform. He is therefore instructed to position his head so that the center of his eyes and the tops of his ears are in the same horizontal plane, as shown by the mirror. A standard is thus found for establishing the height of each person from the platform to the pupils of his eyes. This same standard is to be understood as having been adapted in positioning the mirror vertically, so that all that remains is to have each indication read in terms which are say four inches greater than the height of the eyes so positioned.

To operate the device a person steps upon the platform and deposits a coin in the slot 83 (Figs. 1 and 6), and this coin, as 77, first trips the lever 75 and next descends upon the plate 35 tripping the indicating means for the weighing mechanism, and thereupon the coin drops to a compartment in the lower part of the machine from which it may be taken by an authorized person through the door 84 (Fig. 1). The person then consults the dial 18 to obtain a reading of his weight, or he may first take a reading of his height in the manner described and then note his weight. Upon his stepping off of the platform the parts of the weighing and measuring mechanisms respectively are restored to their initial relative positions.

The invention is not limited to what is herein specifically illustrated and described, and reference should be had to the appended claims to determine the scope of the improvements herein set forth.

I claim:

1. A height-measuring device of the character described including a substantially vertically disposed mirror, said mirror having vertically-spaced-apart sight openings therein, a member having height indications thereon positioned adjacent to said sight openings and being mounted for movement to disclose said height indications through said sight openings and for movement out of such disclosing position, coin-controlled means for causing said member to move so as to disclose said indications through the sight openings when the device is in use, said indications being so arranged that the one thereof which is substantially opposite the eyes of a person standing before said mirror indicates substantially the person's height, and means for moving said member to carry said indications out of such disclosing position when the device is not in use.

2. A height-measuring device of the character described including a substantially vertically disposed mirror, said mirror having vertically-spaced apart sight openings therein, a member having height indications thereon positioned adjacent to said sight openings and being mounted for movement to disclose said height indications through said sight openings and for movement out of such disclosing position, coin-controlled means for causing said member to move so as to disclose said indications through the sight openings when a person stands in front of said mirror and deposits a coin in the device, said indications being so arranged that the one thereof which is substantially opposite the eyes of a person standing before said mirror indicates substantially the person's height, and means releasable by the person's stepping away from in front of said mirror for moving said member to carry said indications out of such disclosing position.

3. A height-measuring device of the character described including a substantially vertically disposed mirror, a vertically moving member having height indications thereon back of said mirror, said mirror having vertically spaced apart sight openings therein for disclosing said indications when the device is in use, the structure between said sight openings concealing said indications when the device is not in use, coin-controlled means for causing said member to move and expose said indications through the sight openings respectively when the device is in use, said indications being so arranged that the one thereof which is substantially opposite the eyes of a person standing before said mirror indicates substantially the person's height, and means for restoring said member to initial position with said indications concealed when the device is not in use.

4. A height-measuring device of the character described comprising a platform upon which a person may stand, an upright frame member, a vertically disposed mirror carried by the frame member, vertically arranged indications movably associated with said mirror to indicate various heights of persons respectively when standing on said platform, said indications having a concealed relative position and an exposed relative position, coin-controlled means for moving said indications to expose them when a person stands on said platform and deposits a coin in the device, and means operable through the removal of weight from said platform for moving said indications into a concealed relative position, said indications being so positioned in vertical arrangement that the one which is substantially opposite the eyes of a person standing on said platform, as shown by said mirror, indicates substantially the person's height.

VINCENT SLEZAK.